US012065166B1

(12) United States Patent
Edren et al.

(10) Patent No.: US 12,065,166 B1
(45) Date of Patent: Aug. 20, 2024

(54) SWITCHABLE RIDE FREQUENCY FOR BIDIRECTIONAL VEHICLES (71) Applicant: Zoox, Inc., Foster City, CA (US)

(72) Inventors: Johannes Edren, Belmont, CA (US); Johannes Andreas Huennekens, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 345 days.

(21) Appl. No.: 17/654,945

(22) Filed: Mar. 15, 2022

(51) Int. Cl.
*B60S 1/52* (2006.01)
*B60G 17/016* (2006.01)
*B60G 17/08* (2006.01)
*B60W 60/00* (2020.01)

(52) U.S. Cl.
CPC ....... *B60W 60/0013* (2020.02); *B60G 17/016* (2013.01); *B60G 17/08* (2013.01); *B60G 2202/24* (2013.01); *B60G 2500/114* (2013.01); *B60W 2520/06* (2013.01); *B60W 2520/10* (2013.01); *B60W 2710/223* (2013.01)

(58) Field of Classification Search
CPC .................................................. B60W 60/0013
See application file for complete search history.

(56) References Cited

U.S. PATENT DOCUMENTS

| 10,029,533 | B1* | 7/2018 | Wigg | B60G 11/26 |
| 2018/0056878 | A1* | 3/2018 | Weller | B60R 1/10 |
| 2020/0070854 | A1* | 3/2020 | Carl | B61F 5/301 |
| 2020/0384980 | A1* | 12/2020 | Yu | B60G 17/0195 |

OTHER PUBLICATIONS

Edren, "Pneumatic Vehicle Suspension System," U.S. Appl. No. 16/443,528, filed Jun. 17, 2019, 66 pages Specification and 7 Figures.
Edren et al., "Pivot Offset Elasto-Hydraulic Bushing," U.S. Appl. No. 17/303,448, filed May 28, 2021; 84 pages Specification and 17 Figures.
Edren et al., "Reducing Hydraulic Fluid Pressure Based on Predicted Collision," U.S. Appl. No. 17/117,015, filed Dec. 9, 2020; 51 pages Specification and 6 Figures.

* cited by examiner

*Primary Examiner* — Vivek D Koppikar
*Assistant Examiner* — Paul W Arellano
(74) *Attorney, Agent, or Firm* — Lee & Hayes, P.C.

(57) ABSTRACT

A bidirectional vehicle may be capable of traveling in either of two directions and may change its direction of travel at any point for various reasons. In response to a change in the direction of travel, systems of a bidirectional vehicle may adjust one or more suspension components using various techniques to configure the vehicle with a higher ride frequency at the trailing axle than at the leading axle to enhance the ride quality and handling capabilities of the vehicle.

20 Claims, 4 Drawing Sheets

SWITCHABLE RIDE FREQUENCY FOR BIDIRECTIONAL VEHICLES

BACKGROUND

The handling capabilities and ride quality of vehicles are largely dependent on the vehicle suspension. A vehicle suspension may include various components used to provide an interface between the wheels of a vehicle and its body or chassis. Suspension components may be designed and configured to enhance the ride quality and handling capabilities of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This application describes systems and techniques for adjusting the ride frequency of individual axles and/or individual wheels of a bidirectional vehicle. In some examples, adjusting the ride frequency may be based at least in part on a change in the direction of travel of the vehicle. The ride frequency or suspension frequency of a vehicle is the natural frequency of the vehicle (e.g., undamped or damped using one or more suspension components). Suspension stiffness may affect (e.g., largely control) the ride frequency and manipulation of suspension stiffness may result in a change in ride frequency. Stiffness may be the rate at which suspension component deforms in response to impact by, or encounters, obstacles or objects in an environment (e.g., going over a bump in the road). A relatively stiff suspension is associated with a higher ride frequency, while a softer, more compliant suspension is associated with a lower ride frequency. Individual vehicle axles and/or wheels may have a corresponding ride frequency that may depend on the suspension stiffness configured at the individual axle or wheel. The suspension stiffness of an individual axle and/or wheel may be determined by the configuration and adjustment of one or more suspension components configured at the axle and/or wheel, such as a shock absorber, damper, bushing, and/or spring.

Vehicle suspension design and tuning involve tradeoffs between vehicle handling and ride quality. A stiffer suspension can increase vehicle agility and handling capabilities (e.g., cornering ability, steering and braking response, etc.), but can reduce ride quality and therefore passenger comfort. On the other hand, a softer, more compliant suspension can increase a vehicle's ride quality but can reduce the vehicle's agility and handling capabilities. Therefore, in some examples, it may be desirable to achieve a balance of stiffness and compliance that provides a good combination of ride quality and handling capabilities.

In an effort to achieve this balance of comfort and performance, a vehicle's suspension may be configured to implement different suspension configurations at different axles and/or wheels of a vehicle. For example, to achieve an acceptable balance of ride comfort and handling, a four-wheeled passenger vehicle may implement a relatively softer (e.g., having a lower ride frequency) suspension configuration at the leading axle (e.g., at the front of the vehicle relative to the direction of travel) than at the trailing axle (e.g., at the rear of the vehicle relative to the direction of travel), which may implement a relatively firmer (e.g., having a higher ride frequency) suspension configuration.

For example, when the wheels of a vehicle encounter a bump, the leading axle travels over the bump first and the suspension components of the vehicle allow for an oscillating vertical movement of the vehicle body relative to the wheels of the leading axle that tapers off over time. The trailing axle travels over the same bump at some time after the leading axle, and the suspension components of the vehicle then allow for an oscillating vertical movement of the vehicle body relative to the wheels of the trailing axle that will also taper off over time. After encountering a bump, the oscillating vertical movement of the vehicle body at the leading axle may be out of phase with the oscillating vertical movement of the vehicle body at the trailing axle, resulting in a pitching of the body when the weight of the vehicle is shifted back and forth between the leading axle and the trailing axle. This body pitch induced by hitting the bump may result in poor ride quality and a reduction in the handling capabilities of the vehicle.

Body pitch may be reduced by configuring a trailing axle (and/or wheels configured thereon) to have a higher ride frequency than a leading axle (and/or wheels configured thereon). By having a higher ride frequency at the trailing axle than at the leading axle, the oscillating vertical movement induced at the trailing axle by traveling over a bump may "catch up" to the oscillating vertical movement induced at the leading axle. When the oscillating vertical movements at both axles are similar or substantially in phase, the resulting effect may be felt as "bounce" rather than pitch and may be more comfortable for passengers and provide better handling capabilities for the vehicle than pitch conditions. In examples, a vehicle may be configured with a stiffer suspension at the trailing axle than at the leading axle to provide the trailing axle with a higher ride frequency than the leading axle. This may be accomplished through configurations of, and/or adjustments to, one or more suspension components configured at one or both such axles. Such components may include struts, shock absorbers, bushings, springs, and/or associated systems and components. In examples, a trailing axle may be configured to have a higher stiffness than a leading axle (e.g., 5%, 10%, 15%, 20%, etc. higher). In examples, the degree or amount that the trailing axle suspension is stiffer than the leading axle suspension may be variable over time and/or conditions. By way of example and not limitation, the degree or amount that the trailing axle suspension is stiffer than the leading axle suspension may be based at least in part on, for example, a speed at which the vehicle is traveling, a roughness of a road surface on which the vehicle is traveling, and size (e.g., height) of obstacles or protrusions/depressions (e.g., speed bumps, pot holes, etc.) detected on/in the road surface in the path of the vehicle.

For bidirectional vehicles with two axles (e.g., four-wheeled bidirectional vehicles configured with two wheels per axle), either axle may serve as the leading axle or the trailing axle depending on the direction in which the vehicle is traveling. For example, when traveling in a first direction, a first axle may serve as the leading axle and a second axle may serve as the trailing axle. When the vehicle changes direction and begins traveling in a second direction (e.g. an opposite direction from the first direction), the second axle may begin serving as the leading axle while the first axle serves as the trailing axle. When a direction of travel is detected, a suspension control system of the vehicle, for example as controlled by a vehicle computing system, may configure the axle currently serving as the trailing axle with a higher ride frequency than the axle currently serving as the leading axle. A suspension control system may adjust the ride frequencies of the axles by adjusting or otherwise manipulating one or more suspension components at the individual axles and/or wheels in response to the change of direction.

In examples, a suspension control system may, by manipulation of one or more associated systems and/or components, adjust the hydraulic and/or pneumatic pressure in one or more suspension components in order to increase or decrease the stiffness of such components and thereby increase or decrease the ride frequency at the axle at which such components are configured. For example, a suspension control system may operate one or more valves that may control the flow of fluid (e.g., hydraulic fluid, air, etc.) to and/or from a chamber to adjust the pressure in a suspension component or system as described in more detail herein. In various examples, a suspension control system may manipulate the air pressure in one or more tires mounted on one or more wheels to increase or decrease the stiffness at the axle on which the wheel is mounted. In other examples, a suspension control system may manipulate one or more other suspension components and/or systems using electrical, magnetic, and/or any other suitable means to increase or decrease the stiffness of such components and thereby increase or decrease the ride frequency at the axle at which such components are configured based at least in part on a change of a vehicle's direction of travel. In some examples, the ride frequency of each axle may additionally be adjusted based on one or more other factors, such as a speed at which the vehicle is traveling, a roughness of a road surface on which the vehicle is traveling, and size (e.g., height) of obstacles or protrusions/depressions (e.g., speed bumps, pot holes, etc.) detected on/in the road surface in the path of the vehicle.

The systems and techniques described herein may be directed to leveraging manipulable suspension components to improve the handling capabilities and ride quality of a bidirectional vehicle, such as an autonomous bidirectional vehicle, based at least in part on the direction of travel of the vehicle. Using these systems and techniques, the ride frequency of axles and/or wheels of a bidirectional vehicle may be adjusted to configure the vehicle's trailing axle with a relatively higher ride frequency than the leading axle based on the detection of a change of direction of the vehicle. By manipulating suspension components to configure a vehicle's trailing axle with a relatively higher ride frequency than its leading axle, the systems and techniques described herein can provide a smoother ride and improve safety outcomes by, for example, improving vehicle handling capabilities and increasing passenger safety by improving ride quality.

The systems and techniques described herein can be implemented in a number of ways. Example implementations are provided below with reference to the following figures. Although discussed in the context of an autonomous vehicle, the techniques described herein can be applied to a variety of systems (e.g., any wheeled system configured with a suspension system) and are not limited to autonomous vehicles. For example, the techniques described herein may be applied to semi-autonomous and/or manually operated vehicles. Furthermore, the disclosed systems and techniques may include processing using various types of components and various types of data and data structures to detect direction and/or change of direction, including, but not limited to, various types of image data or sensor data (e.g., stereo cameras, time-of-flight data, radar data, sonar data, and the like), and/or to control and/or manipulate suspension components. Additionally, the techniques described herein can be used with real data (e.g., captured using sensor(s)), simulated data (e.g., generated by a simulator), or any combination of the two.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one example, or instance, may be combined with the features of other examples or instances. Such modifications and variations are intended to be included within the scope of the disclosure and appended claims.

Figure 1:
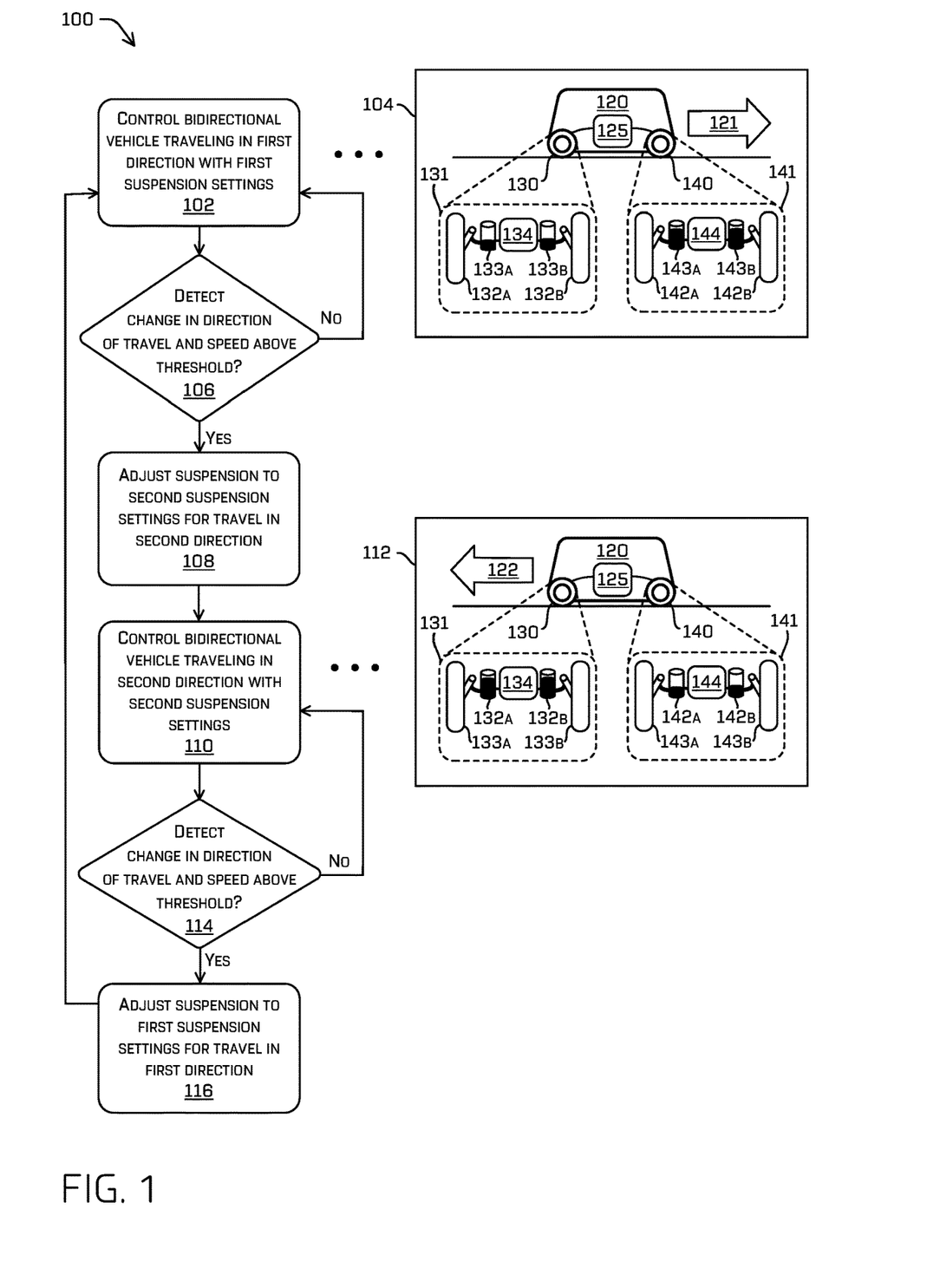
FIG. 1 is a pictorial flow diagram of an example process for determining a change in direction of vehicle travel and adjusting ride frequency by manipulating the suspension subsystems of the leading and/or trailing axles, in accordance with examples of the disclosure.
Figure 2:
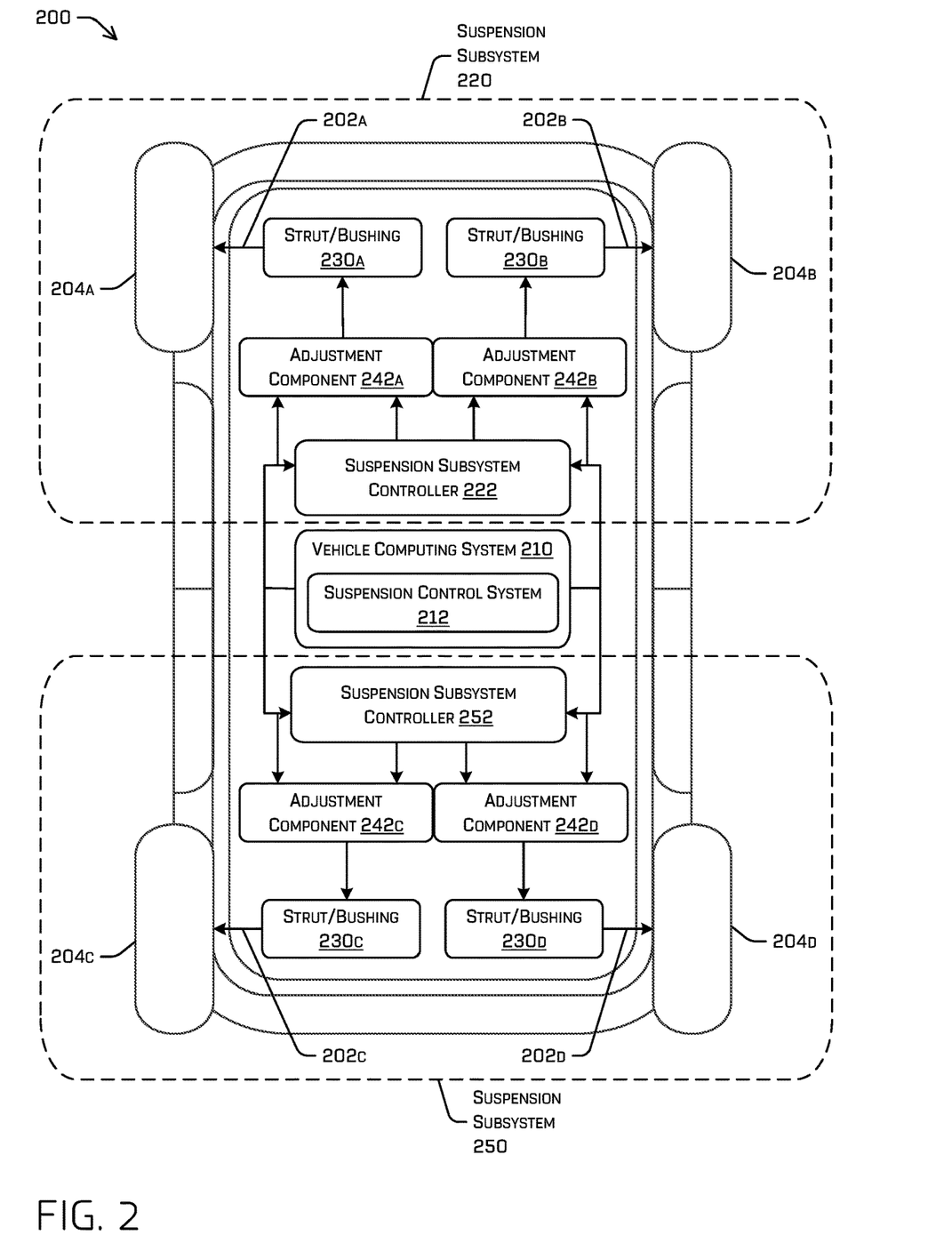
FIG. 2 is a schematic top view of an example vehicle including an example suspension system and subsystems, in accordance with examples of the disclosure.
Figure 5:
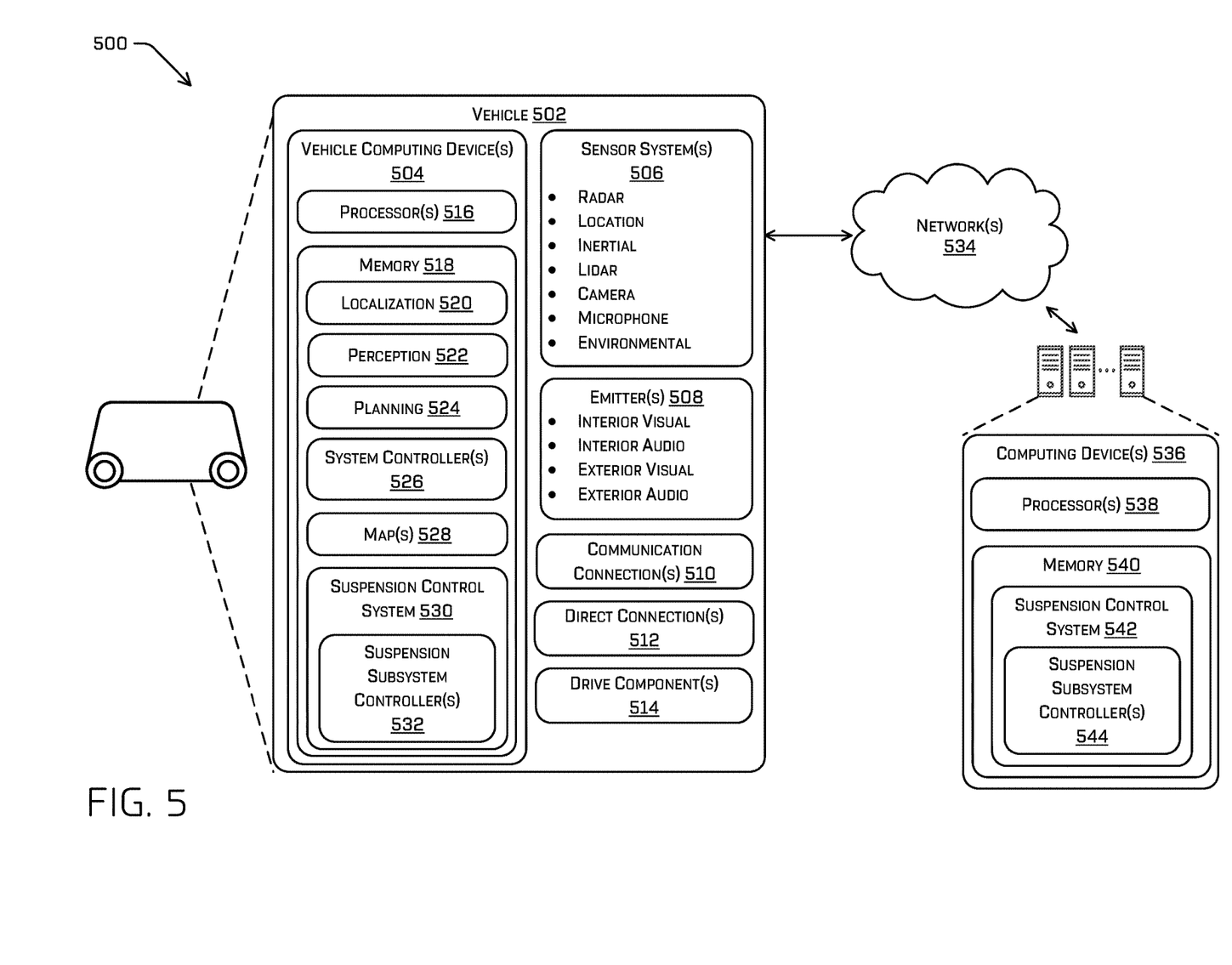
FIG. 5 is a block diagram of an example system for implementing the techniques described herein.

FIG. 1 is a pictorial flow diagram of an example process for controlling a bidirectional vehicle and adjusting the ride frequency at the vehicle's axles based on a change in the direction of travel. In examples, one or more operations of the process 100 may be implemented by a vehicle computing system, such as by using one or more of the components and systems illustrated in FIG. 5 and described below. For example, one or more components and systems can include those associated with the one or more sensor systems 506 and/or the perception component 522 of the vehicle 502 illustrated in FIG. 5. Alternatively, or in addition, one or more components and systems can include those associated with the one or more components of the vehicle 200 illustrated in FIG. 2. In examples, the one or more operations of the process 100 may also, or instead, be performed by a remote system in communication with a vehicle, such as the computing device(s) 536 illustrated in FIG. 5. In still other examples, the one or more operations of the process 100 may be performed by a combination of a remote system and a vehicle computing system. However, the process 100 is not limited to being performed by such components and systems, and the components and systems of FIGS. 2 and 5 are not limited to performing the process 100.

At operation 102, a vehicle computing system may be controlling a bidirectional vehicle capable of traveling in two or more directions. The vehicle computing system may be controlling the vehicle to travel in a first direction in an environment. The bidirectional vehicle may have a suspension system that includes a suspension control system and one or more suspension components configured at the vehicle's axles and/or wheels. The suspension control system may adjust or otherwise manipulate the one or more suspension components to affect the stiffness, and therefore the ride frequency, at individual axles and/or wheels of the vehicle. Various examples of systems and techniques for operating a suspension system and manipulating suspension components are described in more detail below. The suspension control system may be in communication with, or a component of, the vehicle computing system.

In examples, a bidirectional vehicle is one that is configured to switch between traveling in a first longitudinal direction of the vehicle and a second, opposite, longitudinal direction of the vehicle. In other words, there is no fixed "front" or "rear" of the vehicle. Rather, whichever longitudinal end of the vehicle is leading at the time becomes the "front" and the trailing longitudinal end becomes the "rear." In such examples, the axle most proximate to the leading longitudinal end of the vehicle is the "leading axle" and the axle most proximate to the trailing longitudinal end of the vehicle is the "trailing axle." Such a bidirectional vehicle may be capable of operating in either longitudinal direction of the vehicle in a substantially similar manner with substantially similar performance, handling, and ride characteristics regardless of direction.

A bidirectional vehicle may be configured with a drive assembly at each axle and each such drive assembly may have the same or substantially similar components (e.g., steering assembly, propulsion system, braking system, etc.), providing the bidirectional vehicle with the same or substantially similar capabilities for travel in either longitudinal direction. Additionally, a planning component, perception component, sensor systems, emitters (e.g., head lights, indicator lights, etc.), and/or other systems or components of the vehicle may also be configured to transition from a first mode of operation, in which a first longitudinal end of the vehicle is a leading end and a second longitudinal end of the vehicle is a trailing end, and a second mode of operation in which the second longitudinal end of the vehicle is the leading end and the first longitudinal end of the vehicle is the trailing end. The configuration and operation of the planning component, perception component, sensor systems, emitters (e.g., head lights, indicator lights, etc.), and/or other systems or components of the vehicle may be different in the first mode than in the second mode to enable the bidirectional operation of the vehicle. A bidirectional vehicle may also, or instead, be configured with a suspension subsystem at each axle and each such suspension subsystem may have the same or substantially similar components, providing the bidirectional vehicle with the same or substantially similar ride and handling capabilities for travel in either longitudinal direction.

An example 104 illustrates a side view of such a bidirectional vehicle, a bidirectional vehicle 120. The vehicle 120 may be traveling in a first direction 121. The vehicle 120 may be configured with a suspension system that includes a suspension control system 125 that may control one or more suspension components configured at the vehicle axles 130 and 140.

The suspension system of the vehicle 120 may include a suspension subsystem 131 configured with suspension components for associated with the axle 130. The suspension subsystem 131 may include wheels 132a and 132b, adjustable suspension components 133a and 133b associated with individual wheels 132a and 132b, respectively, and a controller 134 that may be configured to adjust or otherwise manipulate adjustable suspension components 133a and 133b. For example, suspension components 133a and 133b may individually include one or more struts, adjustment cylinders, pneumatic systems, actuators, valves, pumps, bushings, and/or fluid reservoirs.

The suspension system of the vehicle 120 may also include a suspension subsystem 141 configured with suspension components for associated with the axle 140. The suspension subsystem 141 may include wheels 142a and 142b, adjustable suspension components 143a and 143b associated with individual wheels 142a and 142b, respectively, and a controller 144 that may be configured to adjust or otherwise manipulate adjustable suspension components 143a and 143b. For example, suspension components 143a and 143b may individually include one or more struts, adjustment cylinders, pneumatic systems, actuators, valves, pumps, bushings, and/or fluid reservoirs.

In this example, because the vehicle is traveling in the first direction 121, the axle 140 is the leading axle and the axle 130 is the trailing axle. Therefore, to ensure improved ride quality and vehicle handling, the suspension subsystem 131 associated with the currently trailing axle 130 may be configured to have a higher ride frequency (e.g., to be stiffer) relative to the suspension subsystem 141 associated with the currently leading axle 130.

At operation 106, the vehicle computing system and/or the suspension control system may determine whether the direction of travel of the vehicle has changed. If a change in the direction of travel is detected, the vehicle computing system and/or the suspension control system may determine the new direction of travel. This may be a default determination (e.g., by default the new, second direction of travel may be the opposite of the previous, first direction of travel in a bidirectional vehicle) or a determination made based on data received or generated by the vehicle computing system and/or the suspension control system.

The determination of operation 106 may be triggered by one or more detected or determined conditions. For example, the vehicle computing system may determine to change the direction of travel based on a trajectory or route that the vehicle computing system has determined. For instance, the vehicle computing system may detect an object in the environment that is blocking a current trajectory. In response, the vehicle computing system may generate a new trajectory that may involving going back in the opposite direction to avoid hitting the object. In another instance, the vehicle computing system may have stopped the vehicle to pick up a passenger and may determine a new route to take the passenger to a desired destination. The new route may require that the vehicle in the opposite direction to reach the destination. In another instance, the vehicle computing system may have controlled the vehicle to park in a parking space traveling in the first direction and may then determine a new trajectory (e.g., based on at least in part on route data including a route to a destination) that the vehicle computing system may use to control the bidirectional vehicle to exit the parking space in the opposite direction and travel along the new trajectory.

Alternatively, or in addition, the vehicle computing system may receive instructions to change the direction of travel of the vehicle (e.g., in the form of a received route or trajectory). In other example, the vehicle computing system may also, or instead, detect a change in the direction of travel based on sensor data (e.g., data associated with any one or more of lidar, radar, cameras, microphones, inertial sensors, accelerometers, magnetometers, gyroscopes, etc.). For example, the vehicle computing system may use one or more wheel encoders (e.g., rotary encoders) to sense rotation of the wheels of one or more drive systems and determine a direction of travel and/or a change in a direction of travel based on such detected rotation.

In other examples, the suspension control system of the vehicle may determine whether the direction of travel of the vehicle has changed at operation 106. For example, the suspension control system may receive an instruction or an indication from the vehicle computing system that the direction of travel has changed. Alternatively, or in addition, the suspension control system may detect a change in the direction of travel based on sensor data (e.g., data associated with any one or more of lidar, radar, cameras, microphones, inertial sensors, accelerometers, magnetometers, gyroscopes, etc.). Such sensor data may be received from a vehicle computing system and/or from one or more sensor systems. For example, the suspension system of the vehicle may be configured with one or more of its own sensors, such as one or more inertial sensors, accelerometers, magnetometers, gyroscopes, etc. The suspension control system may determine whether the vehicle has changed its direction of travel based on data received from such sensors.

In examples, the vehicle computing device may take into account a speed of the vehicle before adjusting suspension components based on a detection of a change in the direction of travel. For example, it may not be efficient to adjust suspension components when a direction of travel is part of a vehicle parking process or other low speed maneuver. In such examples, the vehicle computing device may be configured to determine, at operation 106, whether the vehicle has changed direction and has exceeded a threshold speed (e.g., 2 MPH, 5 MPH, 10 MPH, etc.). However, in other examples, the suspension components may be adjusted based on direction of travel regardless of speed.

If, at operation 106, the vehicle computing system and/or the suspension control system have determined that the vehicle has not changed its direction of travel, the process 100 may return to operation 102 where the vehicle may be controlled using the current (first) suspension settings for travel in the first direction.

At operation 108, if the vehicle computing system and/or the suspension control system determine at operation 106 that the vehicle has changed its direction of travel (and, in examples, the vehicle's speed meets or exceeds a threshold minimum speed), the vehicle computing system and/or the suspension control system may adjust one or more suspension components of the vehicle to accommodate the change of direction. For example, because the new direction of travel may be essentially the opposite direction of the previous direction of travel, the formerly trailing axle may now be the leading axle, and the formerly leading axle may now be the trailing axle. Therefore, the suspension control system may (e.g., based on instruction from the vehicle computing system or independently) adjust one or more suspension components so that the current (new) trailing axle has a higher ride frequency than the current (new) leading axle. The suspension control system may adjust the ride frequency by causing one or more components associated with the current (new) trailing axle to be relatively stiffer than one or more components associated with the current (new) leading axle by adjusting one or more components associated with either or both axles.

In various examples, the vehicle computing system and/or the suspension control system may adjust one or more suspension components of the vehicle to one or more predetermined or preconfigured settings based on whether the associated axle is a trailing axle or a leading axle (e.g., set hydraulic pressure in suspension subsystem to X bar or PSI for trailing axle configuration, Y bar or PSI for leading axle configuration). Alternatively, or in addition, the vehicle computing system and/or the suspension control system may detect data from one or more sensors (e.g., actively determining current stiffness using pressure sensors and/or other sensors, determine a current load and/or a current ride height, detect one or more aspects of a ride height suspension component, determine an occupancy level (e.g., passenger weight, number of passengers, etc.), etc.) in a suspension subsystem and may adjust one or more suspension components of such a subsystem until the data from one or more suspension subsystem sensors matches a desired level. For example, the vehicle computing system and/or the suspension control system may increase the hydraulic pressure in a suspension subsystem to X bar or PSI for trailing axle configuration and/or may reduce the hydraulic pressure in a suspension subsystem to Y bar or PSI for leading axle configuration.

Alternatively, or in addition, the vehicle computing system and/or the suspension control system may detect data from one or more sensors (e.g., pressure sensors) in a suspension subsystem and may adjust one or more suspension components of such a subsystem until the ratio of data from two or more suspension subsystem sensors matches a desired ratio. This may be a preconfigured or preset ratio or an actively determined ratio (e.g., based on tie of service of the vehicle, amount of time the individual axles have served as trailing and/or leading axles, detectable component wear, etc.). For example, the vehicle computing system and/or the suspension control system may increase the pressure in a trailing axle suspension subsystem and/or reduce the pressure in a leading axle suspension subsystem until the trailing axle suspension subsystem is at predetermined greater percentage of pressure than the leading axle suspension subsystem (e.g., 5%, 10%, 15%, 20%, etc.). In examples, a difference of stiffness of a trailing axle suspension subsystem and a leading axle suspension subsystem may be measured or otherwise determined and adjustments of one or more such subsystems may be ceased when the difference meets or exceeds a threshold.

In various examples, the vehicle computing system and/or the suspension control system may adjust one or more suspension components associated with both axles of a bidirectional vehicle based on a change in the direction of travel. For instance, the vehicle computing system and/or the suspension control system may increase the stiffness at the new trailing axle while also decreasing the stiffness at the new leading axle. Alternatively, or in addition, the vehicle computing system and/or the suspension control system may adjust one or more suspension components associated with one of the axles of the vehicle based on a change in the direction of travel while leaving the other axle at the same configuration or settings.

At operation 110, using the suspension settings determined based on the change in direction of travel of the vehicle, the vehicle computing system may control the vehicle in the second direction in the environment.

An example 112 illustrates a side view of the bidirectional vehicle 120 traveling in a second direction 122. Based on detecting the change of travel direction from the first direction 121 (shown in the example 104) to the second direction 122, the suspension control system 125 may have adjusted or otherwise manipulated one or more suspension components configured at the vehicle axles 130 and 140.

For example, because the vehicle is now traveling in the second direction 122, the axle 140 is now the trailing axle and the axle 130 is now the leading axle. Therefore, to ensure improved ride quality and vehicle handling, the suspension subsystem 131 associated with the currently leading axle 130 may be configured to have a lower ride frequency (e.g., to be less stiff) relative to the suspension subsystem 141 associated with the currently trailing axle 130.

For example, the suspension control system 125 manipulate one or more components of the suspension subsystem 131 to be less stiff than one or more corresponding components of the suspension subsystem 141. To accomplish this, the suspension control system 125 may adjust or manipulate one or more of wheels 132a and 132b, adjustable suspension components 133a and 133b associated with individual wheels 132a and 132b, respectively, and the controller 134. In certain examples, the suspension control system 125 may adjust or manipulate one or more struts, adjustment cylinders, pneumatic systems, actuators, valves, pumps, bushings, and/or fluid reservoirs that may be configured in the suspension subsystem 131.

Alternatively, or in addition, the suspension control system 125 manipulates one or more components of the suspension subsystem 141 to be stiffer than one or more corresponding components of the suspension subsystem 131. To accomplish this, the suspension control system 125 may adjust or manipulate one or more of wheels 142a and 142b, adjustable suspension components 143a and 143b associated with individual wheels 142a and 142b, respectively, and the controller 144. In certain examples, the suspension control system 125 may adjust or manipulate one or more struts, adjustment cylinders, pneumatic systems, actuators, valves, pumps, bushings, and/or fluid reservoirs that may be configured in the suspension subsystem 141.

While operating the vehicle in the second direction using the second suspension settings at operation 110, at operation 114 the vehicle computing system and/or the suspension control system may determine whether the direction of travel of the vehicle has changed (e.g., returned to the first direction of travel) using any of the techniques described herein to detect a change in travel direction (e.g., as described in regard to operation 106). In various examples, the vehicle computing system may also determine, at operation 114, whether the vehicle has also exceeded a threshold minimum speed (e.g., also as described in regard to operation 106). If a change in the direction of travel is detected (and, in examples, a minimum speed has been reached), the vehicle computing system and/or the suspension control system may determine the new direction of travel.

If there has been no change in the direction of travel detected at operation 114, the process 100 may return to operation 110 where the vehicle may be controlled using the current (second) suspension settings for the second direction of travel.

At operation 116, if the vehicle computing system and/or the suspension control system determine at operation 114 that the vehicle has changed its direction of travel (e.g., back to the first direction of travel) and, in examples, has met a threshold minimum speed, the vehicle computing system and/or the suspension control system may adjust one or more suspension components of the vehicle to accommodate the change of direction and, in some examples return the suspension settings to the first settings (e.g., used in the operation 102). For example, because the new direction of travel may be essentially the opposite direction of the previous direction of travel, the formerly trailing axle may now be the leading axle, and the formerly leading axle may now be the trailing axle. Therefore, the suspension control system may (e.g., based on instruction from the vehicle computing system or independently) adjust one or more suspension components so that the current (new) trailing axle has a higher ride frequency than the current (new) leading axle. The suspension control system may adjust the ride frequency by causing one or more components associated with the current (new) trailing axle to be relatively stiffer than one or more components associated with the current (new) leading axle by adjusting one or more components associated with either or both axles.

After the suspension adjustments of operation 116, the process 100 may return to operation 102, where the vehicle computing system may control the vehicle in the first direction in the environment using the first suspension setting.

FIG. 2 is a schematic top view of an example vehicle 200 that may implement and/or include one or more of the systems and techniques described herein. For example, the vehicle 200 may be a bidirectional vehicle and may correspond to the example bidirectional vehicle 120 shown in FIG. 1. The vehicle 200 may have a suspension system with one or more suspension components and subsystems.

For example, the vehicle 200 may include a suspension subsystem 220 that includes components associated with a first axle of the vehicle 200 to which wheels 204a and 204b are ultimately connected. Each of the wheels 204a and 204b may be coupled to a chassis of the vehicle 200 via a respective strut and/or bushing 230a and 230b. For example, the struts and/or bushings 230a and 230b may be coupled to a respective wheel 204a and 204b via respective suspension control arms 202a and 202b as schematically depicted in FIG. 2. In some examples, one or more of the struts and/or bushings 230a and 230b may include a pneumatic spring coupled to respective control arms 202a and 202b, and the pneumatic springs may be charged, e.g., by a pneumatic system, to establish a ride frequency of the axle associated with the suspension subsystem 220 as described herein. In other examples, one or more of the struts and/or bushings 230a and 230b may include a strut fluidly connected to an accumulator that may push fluid into the strut and/or withdraw fluid from the strut to increase or decrease, respectively, the stiffness of the strut, thereby establishing a desired ride frequency of the axle associated with the suspension subsystem 220 as described herein. Is still other examples, one or more of the struts and/or bushings 230a and 230b may include a bushing system fluidly connected to a pump and a fluid reservoir that may provide fluid to be pumped into the bushing system and/or withdrawn from the bushing system to increase or decrease, respectively, the stiffness of the bushings, thereby establishing a desired ride frequency of the axle associated with the suspension subsystem 220 as described herein. The struts and/or bushings 230a and 230b may individually include any combination of one or more such components and/or one or more of any other suitable adjustable suspension components.

The suspension subsystem 220 may also, or instead, include adjustment components 242a and 242b. The adjustment components 242a and 242b may be any one or more pumps, reservoirs, accumulators, fluid chambers, air chambers, bladder, pneumatic components, hydraulic components, any other suitable suspension adjustment component, or any combination thereof that may be used to adjust or otherwise manipulate any type of suspension component. The suspension subsystem 220 may also, or instead, include a suspension subsystem controller 222 that may control one or more components of the suspension subsystem 220. The suspension subsystem controller 222 may also, or instead, be configured to receive instructions and/or data from a vehicle computing system 210 and/or a suspension control system 212. The suspension subsystem controller 222 may use such data and/or instruction to control one or more components of the suspension subsystem 220.

The vehicle 200 may also, or instead, include a suspension subsystem 250 that includes components associated with a second axle of the vehicle 200 to which wheels 204c and 204d are ultimately connected. Each of the wheels 204c and 204d may be coupled to a chassis of the vehicle 200 via a respective strut and/or bushing 230c and 230d. For example, the struts and/or bushings 230c and 230d may be coupled to a respective wheel 204c and 204d via respective suspension control arms 202c and 202d as schematically depicted in FIG. 2. In some examples, one or more of the struts and/or bushings 230c and 230d may include a pneumatic spring coupled to respective control arms 202c and 202d, and the pneumatic springs may be charged, e.g., by a pneumatic system, to establish a ride frequency of the axle associated with the suspension subsystem 250 as described herein. In other examples, one or more of the struts and/or bushings 230c and 230d may include a strut fluidly connected to an accumulator that may push fluid into the strut and/or withdraw fluid from the strut to increase or decrease, respectively, the stiffness of the strut, thereby establishing a desired ride frequency of the axle associated with the suspension subsystem 250 as described herein. In examples, one or more of the struts and/or bushings 230c and 230d may include a bushing system fluidly connected to a pump and a fluid reservoir that may provide fluid to be pumped into the bushing system and/or withdrawn from the bushing system to increase or decrease, respectively, the stiffness of the bushings, thereby establishing a desired ride frequency of the axle associated with the suspension subsystem 250 as described herein. The struts and/or bushings 230c and 230d may individually include any combination of one or more such components and/or one or more of any other suitable adjustable suspension components.

The suspension subsystem 250 may also, or instead, include adjustment components 242c and 242d. The adjustment components 242c and 242d may be any one or more pumps, reservoirs, accumulators, fluid chambers, air chambers, bladder, pneumatic components, hydraulic components, any other suitable suspension adjustment component, or any combination thereof that may be used to adjust or otherwise manipulate any type of suspension component. The suspension subsystem 250 may also, or instead, include a suspension subsystem controller 252 that may control one or more components of the suspension subsystem 250. The suspension subsystem controller 252 may also, or instead, be configured to receive instructions and/or data from the vehicle computing system 210 and/or the suspension control system 212. The suspension subsystem controller 252 may use such data and/or instruction to control one or more components of the suspension subsystem 250.

In examples, the suspension subsystems of the vehicle 200 may be independently operable and each suspension subsystem may include separate components, controller(s), sensor(s), strut(s), pump(s), valve(s), etc. Alternatively, the suspension subsystems of the vehicle 200 may share one or more components and/or controllers. The individual suspension subsystems of the vehicle 200 and components therein may be similar and/or function similarly or may be different types of suspension subsystems and may function in different manners. For example, the suspension subsystem 220 may have substantially similar components and a substantially similar configuration to the suspension subsystem 250. Alternatively, the suspension subsystem 220 may have one or more components and/or a configuration that differs from those of the suspension subsystem 250.

The vehicle 200 may also, or instead, include the vehicle computing system 210 and the suspension control system 212 as mentioned above. The suspension control system 212 may be a hardware, software, and/or a combination thereof that is functionally a component of the vehicle computing system 210. Alternatively, the suspension control system 212 may be a separate and distinct (e.g., physically and/or logically) component from the vehicle computing system 210.

The vehicle computing system 210 and/or the suspension control system 212 of the vehicle 200 may determine whether the direction of travel of the vehicle 200 has changed. For example, the vehicle computing system 210 and/or the suspension control system 212 receive an instruction or an indication to change the direction of travel (e.g., based on a received route or trajectory). Alternatively, or in addition, the vehicle computing system 210 and/or the suspension control system 212 may detect a change in the direction of travel based on sensor data (e.g., data associated with any one or more of lidar, radar, cameras, microphones, inertial sensors, accelerometers, magnetometers, gyroscopes, etc.).

Based on detecting or determining a change in the direction of travel for the vehicle 200, the vehicle computing system 210 and/or the suspension control system 212 may adjust one or more suspension components of the vehicle 200 to accommodate the change of direction. For example, let the axle of the suspension subsystem 220 be a current trailing axle and the axle of the suspension subsystem 250 be a current leading axle based on a current direction of travel. When the vehicle computing system 210 and/or the suspension control system 212 detect a change in the direction of travel, the vehicle computing system 210 and/or the suspension control system 212 may determine, e.g., because the new direction of travel may be essentially the opposite direction of the previous direction of travel, that the axle of the suspension subsystem 220 is now to be the (new) leading axle and the axle of the suspension subsystem 250 is now to be the (new) trailing axle based on the new direction of travel.

Based on determining that the trailing axle and leading axle roles have switched between the axle of the suspension subsystem 250 and the axle of the suspension subsystem 220, the suspension control system 212 may (e.g., based on instruction from the vehicle computing system 210 or independently) adjust one or more suspension components of the suspension subsystem 250 to be stiffer so that the axle of the suspension subsystem 250 has a higher ride frequency than the axle of the suspension subsystem 220. Alternatively, or in addition, the suspension control system 212 may (e.g., based on instruction from the vehicle computing system 210 or independently) adjust one or more suspension components of the suspension subsystem 220 to be softer so that the axle of the suspension subsystem 220 has a lower ride frequency than the axle of the suspension subsystem 250.

Figure 3:
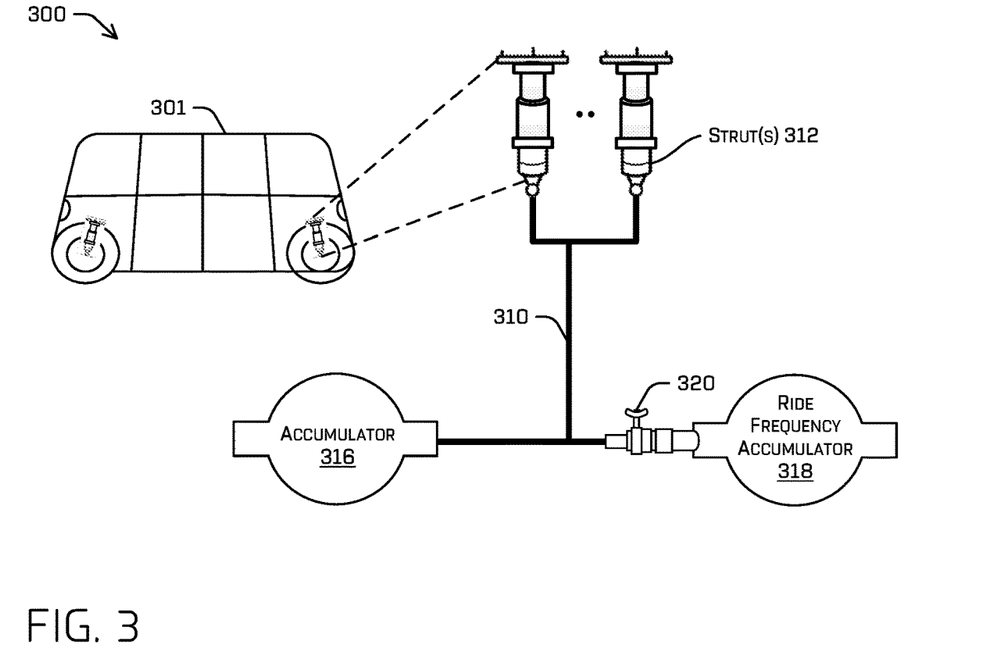
FIG. 3 is an illustration of an example suspension subsystem, in accordance with examples of the disclosure.

FIG. 3 illustrates an example suspension subsystem 300 that may be configured in a bidirectional vehicle 301 in accordance with examples of the disclosure. The suspension subsystem 300 may be configured on a longitudinal end (e.g., front, back, first end, second end, etc.) of the bidirectional vehicle 301 and about or associated with an axle. For example, one or both of suspension subsystems 220 and 250 of the vehicle 200 shown in FIG. 2 may include all or portions of the suspension subsystem 300. However, the vehicles 200 and 301 may include additional suspension components and/or not include all components of suspension subsystem 300.

The suspension subsystem 300 may include a hydraulic circuit 310 that includes various components, including, but not limited to strut(s) 312, an accumulator 316, a ride frequency accumulator 318, and a valve 320, which may include one or more various valves (e.g., analogue valves active valves, passive valves, pressure valves, temperature valves, etc.). The suspension subsystem 300 may include additional components for carrying out an operation of the suspension subsystem 300, such as manifolds, check valves, pressure gauges, and so forth. The strut(s) 312, accumulator 316, ride frequency accumulator 318, and/or the valve 320 may fluidly connect to one another via the hydraulic circuit 310 that may include one or more hydraulic lines. Although hydraulic lines connecting both accumulators 316 and 318 to two struts 312 are shown, it is to be understood that the suspension subsystem 300 may include additional hydraulic lines that may individually connect either or both of accumulators 316 and 318 to any one or more struts and/or other suspension components. Advantageously, valve 320 may be actuated to change the state of hydraulic circuit 310 between one of two different ride frequencies which may each corresponding to a respective bidirectional driving direction.

In examples, a ride frequency of a hydraulic suspension system can be adjusted by modifying a volume of hydraulic fluid in the system (e.g., via actuation of valve 320) or by changing a rate of flow between components. For example, valve 320 may be an analog valve or may otherwise be configured to provide multiple different flows (e.g., either analog or discrete) between ride frequency accumulator 318 and hydraulic circuit 310. In such examples, accumulator 316 may be unnecessary.

The accumulator 316 may be any one or more accumulators or other suspension components that may control and/or adjust suspension properties of the vehicle 301. Such adjustments may be performed to maintain a consistent ride height of the vehicle 301 when the load of the vehicle 301 changes. The accumulator 316 may be a hydraulic suspension component, a pneumatic suspension component, any other type of suspension component, or any combination thereof.

The ride frequency accumulator 318 may be any one or more accumulators or other suspension components that may control and/or adjust a ride frequency of the vehicle 301. Such adjustments may be performed to maintain a comfortable ride and consistent handling of the vehicle 301 when the direction of travel of the vehicle 301 changes, as described herein. The ride frequency accumulator 318 may be a hydraulic suspension component, a pneumatic suspension component, any other type of suspension component, or any combination thereof.

In examples, the valve 320 (e.g., as controlled by a vehicle computing system, a suspension control system, and/or a suspension subsystem controller) may be opened or closed (e.g., to any extent) allowing or inhibiting the flow of hydraulic fluid into the ride frequency accumulator 318, resulting in a manipulation of the hydraulic pressure in the hydraulic circuit 310. This in turn may affect the resistance to movement provided by the strut(s) 312.

For example, when the valve 320 is (e.g., relatively) open, hydraulic fluid in the hydraulic circuit 310 is free to expand into the ride frequency accumulator 318. In turn, the strut(s) 312 are able to more freely expand and contract because of the resulting lower hydraulic pressure in the hydraulic circuit 310, thereby providing less resistance to movement and resulting in a softer, more compliant ride. Alternatively, when the valve 320 is (e.g., relatively) closed, hydraulic fluid in the hydraulic circuit 310 is prohibited from expanding into the ride frequency accumulator 318. In turn, the strut(s) 312 are less able to expand and contract because of the resulting higher hydraulic pressure in the hydraulic circuit 310, thereby providing more resistance to movement and resulting in a stiffer and firmer ride.

The accumulators 316 and 318 and the valve 320 may be controlled (e.g., by a suspension control system or vehicle computing system as described herein) to adjust the stiffness and therefore the ride frequency of an axle and/or a wheel configured at a bidirectional vehicle. For example, the valve 320 may be controlled to close and inhibit the expansion of hydraulic fluid in the hydraulic circuit 310 into the ride frequency accumulator to increase the pressure within the hydraulic circuit 310 and therefore the strut(s) 312, thereby increasing the stiffness and corresponding ride frequency for the axle at which the strut(s) 312 are configured. In another example, the valve 320 may be controlled to open and allow the expansion of hydraulic fluid in the hydraulic circuit 310 into the ride frequency accumulator to reduce the pressure within the hydraulic circuit 310 and therefore the strut(s) 312, thereby reducing the stiffness and corresponding ride frequency for the axle at which the strut(s) 312 are configured.

In examples, both such operations may be performed at opposite axles. For instance, in response to detecting a change of travel direction in a bidirectional vehicle, a vehicle computing system and/or suspension control system may control a valve configured at the (new) leading axle to open and allow hydraulic fluid into the ride frequency accumulator to reduce the pressure provided by hydraulic fluid to one or more fluidly connected struts, thereby reducing the stiffness and corresponding ride frequency for the (new) leading axle. Substantially simultaneously, the vehicle computing system and/or suspension control system may control a valve configured at the (new) trailing axle to close and inhibit hydraulic fluid from entering the ride frequency accumulator to increase the pressure provided by hydraulic fluid to one or more fluidly connected struts, thereby increasing the stiffness and corresponding ride frequency for the (new) trailing axle. In this way, improves ride quality and handling may be maintained as the direction of travel of the vehicle changes.

In examples, the valve 320 may be controlled to be open or closed to any degree (e.g., by a vehicle computing system, a suspension control system, and/or a suspension subsystem controller), allowing for a precise level of fluid flow between the hydraulic circuit 310 and the ride frequency accumulator 318.

In examples, the hydraulic fluid using in the hydraulic circuit 310 may be a smart fluid material such as a magnetorheological fluid, electrorheological fluid, or any like material whose viscosity may be modified by the application of a magnetic field, electric field, electromagnetic field, or any combination thereof. By changing viscosity of the fluid, the corresponding ride frequency component of the axle can be modified as disclosed herein. As used herein, modifying a stiffness of a suspension component, such as a strut, can include changing a viscosity of a smart fluid contained therein.

In examples, the suspension subsystem may employ activated carbon. In such examples, one or more activated carbon components may be configured in the suspension subsystem 300 that may be manipulated by, e.g., one or more valves, to adjust the stiffness in the strut(s) 312 and therefore adjust the ride frequency of the suspension subsystem 300. For example, a valve may be selectively controlled to manipulate activated carbon configured in the struts(s) 312 (e.g., by a vehicle computing system, a suspension control system, and/or a suspension subsystem controller) to increase and/or decrease the stiffness of the struts(s) 312 and therefore the corresponding ride frequency for the associated axle.

In examples, one or more springs may also, or instead, be mechanically manipulated to affect the stiffness of the axle at which they are configured. For example, the suspension subsystem 300 may be controlled (e.g., by a vehicle computing system, a suspension control system, and/or a suspension subsystem controller) to selective engage one or more portions of one or more springs to adjust the stiffness at the springs. Such springs may be configured about the strut(s) 312 and/or elsewhere within the suspension subsystem 300. For instance, by mechanically engaging a larger portion of such springs, the stiffness may be reduced, for example, in response to determining that the associated axle is a leading axle. Alternatively, by mechanically engaging a smaller portion of such springs, the stiffness may be increased, for example, in response to determining that the associated axle is a trailing axle.

Figure 4:
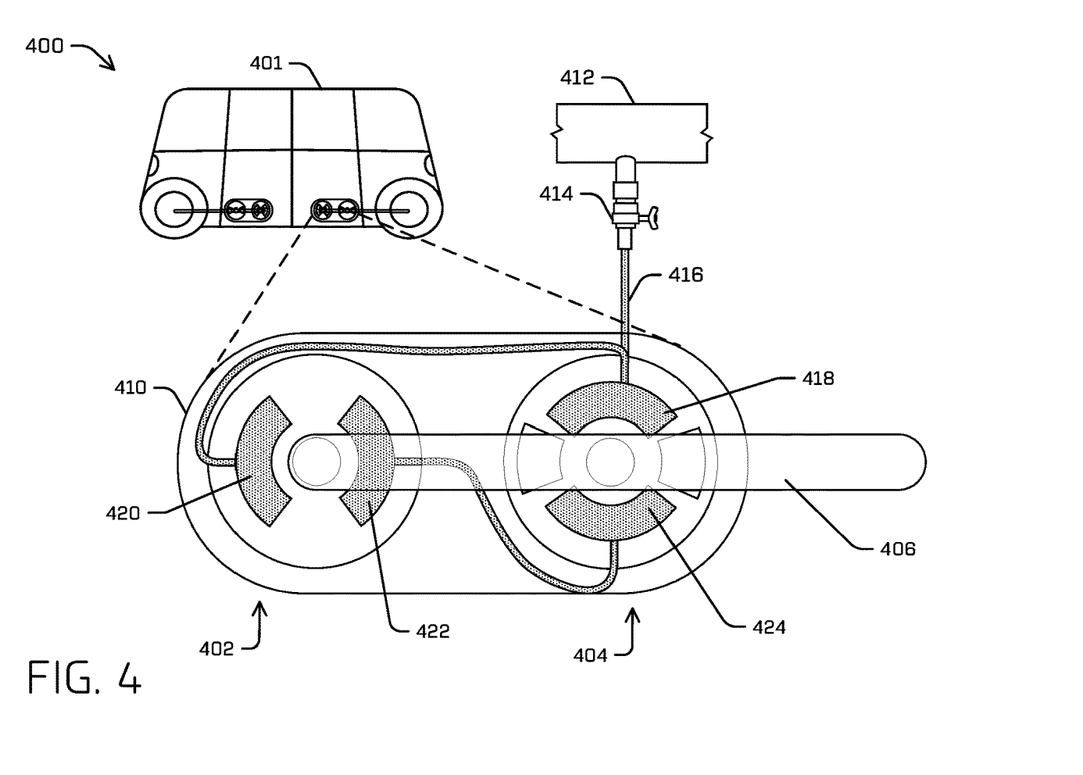
FIG. 4 is an illustration of another example suspension subsystem, in accordance with examples of the disclosure.

FIG. 4 illustrates an example suspension subsystem 400 that may be configured in a bidirectional vehicle 401 in accordance with examples of the disclosure. The suspension subsystem 400 may be configured on longitudinal ends (e.g., front, back, first end, second end, etc.) of a bidirectional vehicle and about or associated with an axle. For example, one or both of suspension subsystems 220 and 250 of the vehicle 200 shown in FIG. 2 may include all or portions of the suspension system 400. However, the vehicles 200 and 401 may include additional suspension components and/or not include all components of suspension subsystem 400.

In examples, the suspension subsystem 400 may include an elasto-hydraulic bushing system 410 that may improve shock absorption, dampen vibration, reduce noise, or any combination thereof by transforming rotational motion of a suspension arm into translational motion, translational motion of a suspension arm into rotational motion, or any combination thereof. The reaction of the bushing system 410 to an event may be controlled by one or more of a fluid flow, modification of a fluid, modification of an elastomeric material, and any combination thereof. In examples, the hydraulic fluid used in the suspension subsystem 400 and within the bushing system 410 may be a smart fluid material such as a magnetorheological fluid, electrorheological fluid, or any like material whose viscosity may be modified by the application of a magnetic field, electric field, electromagnetic field, or any combination thereof.

The bushing system 410 may include bushings 402 and 404 coupled to a suspension arm 406. In examples, at least one of the bushings 402 and 404 connecting suspension arm 406 to vehicle 401 may be a double-pin bushing system. Bushing 402 may be configured with chambers 420 and 422 and bushing 404 may be configured with chambers 418 and 424. In examples, chambers 420 and 422 may be arranged on opposite left and right sides of the bushing 402 sequentially along an axis that is horizontal to a bottom surface of vehicle 401. In examples, chambers 481 and 424 may be arranged at a top and bottom of the bushing 404 (e.g., over and under control arm 406) opposite each other and sequentially arranged along a vertical axis that is perpendicular to the horizontal axis along which chambers 420 and 422 are arranged.

In examples, chamber 418 may be fluidly connected to chamber 420 while chamber 422 may be fluidly connected to chamber 424. The chambers 418, 420, 422, and 424 may individually be fluidly connected to a dedicated or a common fluid reservoir 412 (e.g., directly or via another chamber) by one or more flow lines. Such fluid reservoirs may include a pump and valve system 414 and may be operated by a suspension subsystem controller, a suspension control system, and/or a vehicle computing system. The pump and valve system 414 may include any number and combination of suitable pumps and fluid valves, including as described herein. A pump in the pump and valve system 414 may be configured to work in reverse. A valve of the pump and valve system 414 may be used to open or close the flow line 416 associated thereto. In examples, the pump and valve system 414 may be configured to inject fluid into one or more the chambers 418, 420, 422, and 424, suction fluid from one or more the chambers 418, 420, 422, and 424, or both to control, manipulate, and/or adjust the operation of bushing system 410.

The pump and valve system 414 may be controlled (e.g., by a suspension control system or vehicle computing system as described herein) to adjust the stiffness and therefore the ride frequency of an axle and/or a wheel configured at a bidirectional vehicle. For example, the pump and valve system 414 may be controlled to increase the pressure provided by hydraulic fluid within one or more of the chambers 418, 420, 422, and 424 by pumping more fluid from the reservoir 412 into such chambers, thereby increasing the stiffness and corresponding ride frequency for the axle to which the control arm 406 is connected. In another example, the accumulator 318 may be controlled reduce the pressure provided by hydraulic fluid within one or more of the chambers 418, 420, 422, and 424 by suctioning fluid from one or more such chambers into the reservoir 412, thereby reducing the stiffness and corresponding ride frequency for the axle to which the control arm 406 is connected.

In examples, both such operations may be performed at opposite axles. For instance, in response to detecting a change of travel direction in a bidirectional vehicle, a vehicle computing system and/or suspension control system may control a pump and valve system at the current (new) leading axle to reduce the pressure provided by hydraulic fluid within one or more of the chambers in a bushing system configured at that axle by suctioning fluid from one or more such chambers into a reservoir, thereby reducing the stiffness and corresponding ride frequency for the (new) leading axle. Substantially simultaneously, the vehicle computing system and/or suspension control system may control a pump and valve system at the current (new) trailing axle to increase the pressure provided by hydraulic fluid within one or more of the chambers in a bushing system configured at that axle by pumping fluid into one or more such chambers from a reservoir, thereby increasing the stiffness and corresponding ride frequency for the (new) trailing axle. In this way, improves ride quality and handling may be maintained as the direction of travel of the vehicle changes.

In some examples, a combination of components of suspension subsystems 300 and 400 may be configured on a bidirectional vehicle and controlled to adjust ride frequency based on a change in vehicle direction of travel. For example, a subsystem using struts as described in regard to subsystem 300 and a subsystem using bushings as described in regard to subsystem 400 may both be implemented at one or both axles of a bidirectional vehicle. Alternatively, one axle of such a vehicle may implement a strut system as described in regard to subsystem 300 while the opposite axle may be configured with a bushing system as described in regard to subsystem 400. In other examples, any combination of any one or more components of subsystem 300, subsystem 400, and any other suspension systems and components may be configured at a bidirectional vehicle that may implement the techniques and systems described herein to adjust ride frequency based on a change in vehicle direction of travel.

FIG. 5 illustrates a block diagram of an example system 500 that implements the techniques discussed herein. In some instances, the example system 500 may include a bidirectional vehicle 502, which may represent any of the vehicles 120 in FIG. 1, 200 in FIG. 2, 301 in FIGS. 3, and 401 in FIG. 4. In some instances, the vehicle bidirectional 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the bidirectional vehicle 502 may be a fully or partially autonomous vehicle having any other level or classification. Moreover, in some instances, the techniques described herein may be usable by non-autonomous vehicles as well.

The vehicle 502 may include one or more vehicle computing device(s) 504, one or more sensor systems 506, one or more emitters 508, one or more network communications connections 510 (also referred to as communication devices, interfaces, and/or modems), one or more direct connections 512, and one or more drive components 514. In some instances, the one or more sensor systems 506 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor systems 506 may include multiple instances of each of these or other types of sensors. For instance, the time-of-flight sensors may include individual time-of-flight sensors located at the corners, front, back, sides, and/or top of the vehicle 502. As another example, the camera sensors may include multiple cameras disposed at various locations about the exterior and/or interior of the vehicle 502. The one or more sensor systems 506 may provide input to the vehicle computing device(s) 504. In examples, the one or more sensor systems 506 may generate data that may be used to detect or determine a change of direction of travel for a bidirectional vehicle.

The one or more emitter(s) 508 may emit light and/or sound. The one or more emitter(s) 508 in this example may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 may also include one or more communications connections 510 and one or more direct connections 512 that enable communication between the vehicle 502 and one or more other local or remote computing device(s) (e.g., a remote teleoperation computing device) or remote services. For instance, the one or more connections 512 may facilitate communication with other local computing device(s) on the vehicle 502. Also, the one or more connections 510 may allow the vehicle 502 to communicate with other nearby computing device(s) (e.g., other nearby vehicles, traffic signals, etc.). The one or more connections 510 may include physical and/or logical interfaces for connecting the vehicle computing device(s) 504 to another computing device or one or more external networks (e.g., the Internet). For example, the one or more connections 510 may enable Wi-Fi-based communication such as via frequencies defined by the IEEE 802.11 standards, short range wireless frequencies such as Bluetooth, cellular communication (e.g., 2G, 3G, 4G, 4G LTE, 4G, 5G, etc.), satellite communication, dedicated short-range communications (DSRC), and/or any suitable wired or wireless communications protocol that enables the respective computing device to interface with the other computing device(s).

In at least one example, the vehicle 502 may include one or more drive components 514. In some examples, the vehicle 502 may have a single drive component 514. In at least one example, if the vehicle 502 may have multiple drive components 514, where individual drive components 514 may be positioned on opposite ends of the vehicle 502 (e.g., at or about a first axle and a second axle). In at least one example, the drive components 514 may include the one or more sensor systems 506 to detect conditions of the drive component(s) 514 (e.g., direction of travel) and/or the surroundings of the vehicle 502. By way of example and not limitation, the sensor system(s) 506 may include one or more wheel encoders (e.g., rotary encoders) to sense rotation of the wheels of the drive systems (e.g., on which a determination of a direction of travel may be based), inertial sensors (e.g., inertial measurement units, accelerometers, gyroscopes, magnetometers, etc.) to measure orientation and acceleration of the drive system (e.g., on which a determination of a direction of travel may be based), cameras or other image sensors, ultrasonic sensors to acoustically detect objects in the surroundings of the drive system, lidar sensors, radar sensors, etc. Data from any one or more such sensors may be used to determine a direction of a bidirectional vehicle. Some sensors, such as the wheel encoders may be unique to the drive component(s) 514. In some cases, the sensor system(s) 506 on the drive component(s) 514 may overlap or supplement corresponding systems of the vehicle 502 (e.g., sensor system(s) 506).

The drive component(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 514 may include a drive system controller which may receive and preprocess data from the sensor system(s) 506 and to control operation of the various system(s) and/or component(s) of the vehicle 502. In some examples, the drive system controller may include one or more processor(s) and memory communicatively coupled with the one or more processor(s). The memory may store one or more components to perform various functionalities of the drive component(s) 514. Furthermore, the drive component(s) 514 also include one or more communication connection(s) that enable communication by the respective drive system with one or more other local or remote computing device(s).

As shown, the vehicle computing device 504 may include one or more processor(s) 516 and memory 518 communicatively coupled with the one or more processor(s) 516. In the illustrated example, the memory 518 of the vehicle computing device(s) 504 stores a localization component 520, a perception component 522, a planning component 524, one or more system controllers 526, a map component 528, and a suspension control system 530. The suspension control system 530 may include one or more suspension subsystem controllers 532 as described herein. Although depicted as a component of the suspension control system 530, the one or more suspension subsystem controllers 532 may be separately configured and may be distinct from, and in communication with, the suspension control system 530. Though depicted as residing in the memory 518 for illustrative purposes, it is contemplated that the localization component 520, the perception component 522, the planning component 524, the one or more system controllers 526, the maps component 528, the suspension control system 530, and the one or more suspension subsystem controllers 532 may additionally, or alternatively, be accessible to the vehicle computing device(s) 504 (e.g., stored in a different component of vehicle 502) and/or be accessible to the vehicle 502 (e.g., stored remotely).

In the memory 518 of the vehicle computing device(s) 504, the localization component 520 may include functionality to receive data from the sensor system(s) 506 to determine a position of the vehicle 502. For example, the localization component 520 may include and/or request/receive a three-dimensional map of an environment and may continuously determine a location of the autonomous vehicle within the map. Using these location determinations, the localization component 520 and/or one or more other components of the vehicle 502 may determine a direction of travel of the vehicle 502 for use in the systems and technique described herein for adjusting ride frequency. In some instances, the localization component 520 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 520 may provide data to various components of the vehicle 502 to determine an initial position of an autonomous vehicle for generating a trajectory, determining a direction of travel, and/or determining a change in a direction of travel, as discussed herein.

The perception component 522 may include functionality to perform object detection, segmentation, and/or classification. In some examples, the perception component 522 may provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In some instances, the perception component 522 may include functionality to store perception data generated by the perception component 522. In some instances, the perception component 522 may determine a track corresponding to an object that has been classified as an object type. The stored perception data may, in some examples, include fused perception data captured by the vehicle 502. Fused perception data may include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.).

In additional and/or alternative examples, the perception component 522 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 522 may use perception algorithms to determine a perception-based bounding box associated with an object in the environment based on sensor data. For example, the perception component 522 may receive image data from the one or more sensor systems 506 and classify the image data to determine that an object is represented in the image data. Then, using detection algorithms, the perception component 522 may generate a two-dimensional bounding box and/or a perception-based three-dimensional bounding box associated with the object. The perception component 522 may further generate a three-dimensional bounding box associated with the object. The three-dimensional bounding box may provide additional information such as a location, orientation, pose, and/or size (e.g., size, width, height, etc.) associated with the object.

The planning component 524 may determine a path for the vehicle 502 to follow to traverse through an environment. For example, the planning component 524 may determine various routes and paths and various levels of detail. In some instances, the planning component 524 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 524 may generate an instruction for guiding the vehicle 502 along at least a portion of the route from the first location to the second location. The vehicle 502 and/or one or more associated components may use such an instruction to determine whether a direction of travel of the vehicle 502 has changed or will change. In at least one example, the planning component 524 may determine how to guide the vehicle 502 from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 524 may alternatively, or additionally, use data from the perception component 522 to determine a path for the vehicle 502 to follow to traverse through an environment. For example, the planning component 524 may receive data from the perception component 522 regarding objects associated with an environment. Using this data, the planning component 524 may determine a route to travel from a first location (e.g., a current location) to a second location (e.g., a target location) to avoid objects in an environment. In at least some examples, such a planning component 524 may determine there is no such collision free path and, in turn, provide a path which brings vehicle 502 to a safe stop avoiding all collisions and/or otherwise mitigating damage. In at least some examples, such a planning component 524 may determine the route to travel from a current location to a target location requires a change of direction, which may be used as a basis for performing operations as described herein to adjust a vehicle's ride frequency.

The memory 518 may further include one or more map components 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more map components 528 may include at least one map (e.g., images and/or a mesh). In some examples, the vehicle 502 may be controlled based at least in part on the map component(s) 528. That is, the map component(s) 528 may be used in connection with the localization component 520, the perception component 522 (and sub-components), and/or the planning component 524 to determine a location of the vehicle 502, identify objects in an environment, generate prediction probability(ies) associated with objects and/or the vehicle 502, and/or generate routes and/or trajectories to navigate within an environment.

In at least one example, the vehicle computing device 504 may include one or more system controllers 526, which may be configured to control steering, propulsion, braking, safety, emitters, communication, and other systems of the vehicle 502. These system controller(s) 526 may communicate with and/or control corresponding systems of the drive component(s) 514 and/or other components of the vehicle 502, which may be configured to operate in accordance with a path provided from the planning component 524.

The vehicle 502 may connect to computing device(s) 536 via a network 534 and may include one or more processor(s) 538 and memory 540 communicatively coupled with the one or more processor(s) 538. In at least one instance, the one or more processor(s) 538 may be similar to the processor(s) 516 and the memory 540 may be similar to the memory 518. For example, the memory 540 may store a suspension control system 542 that may perform operations similar to the suspension control system 530 of the vehicle computing device 504 and/or any other suspension control system described herein. In another example, the memory 540 may store one or more suspension subsystem controllers 544 that may be similar to the one or more suspension subsystem controllers 532 of the vehicle computing device 504 and/or any other suspension subsystem controller as described herein.

The processor(s) 516 of the vehicle computing device 504 and the processor(s) 538 of the computing device(s) 536 may be any suitable one or more processors capable of executing instructions to process data and perform operations as described herein. By way of example and not limitation, the processor(s) 516 and 538 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 518 of the vehicle computing device 504 and the memory 540 of the computing device(s) 536 are examples of non-transitory computer-readable media. The memories 518 and 540 may store an operating system and one or more software applications, instructions, programs, and/or data to implement the methods described herein and the functions attributed to the various systems. In various implementations, the memories 518 and 540 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine-learning algorithms. For example, in some instances, the components in the memories 518 and 540 may be implemented as a neural network.

As described herein, an exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

It should be noted that while FIG. 5 is illustrated as a distributed system, in alternative examples, components of the vehicle 502 can be associated with the computing device(s) 536 and/or components of the computing device(s) 536 can be associated with the vehicle 502. That is, the vehicle 502 can perform one or more of the functions associated with the computing device(s) 536, and vice versa.

Example Clauses

The following paragraphs describe various examples. Any of the examples in this section may be used with any other of the examples in this section and/or any of the other examples or embodiments described herein.

A: A bidirectional autonomous vehicle comprising: a first suspension subsystem associated with a first axle of the bidirectional autonomous vehicle; a second suspension subsystem associated with a second axle of the bidirectional autonomous vehicle; and a vehicle computing system comprising one or more processors and one or more non-transitory computer-readable media storing instructions executable by the one or more processors, wherein the instructions, when executed, cause the vehicle computing system to perform operations comprising: determining that the bidirectional autonomous vehicle has altered its direction of travel from a first direction to a second direction, wherein altering its direction of travel comprises modifying a mode of a planner component of the bidirectional autonomous vehicle to primarily operate in the second direction and wherein the first direction opposes the second direction; and based at least in part on determining that the bidirectional autonomous vehicle has altered its direction of travel from the first direction to the second direction: determining, based on the second direction, that the first axle is a leading axle of the bidirectional autonomous vehicle; determining, based on the second direction, that the second axle is a trailing axle of the bidirectional autonomous vehicle; based at least in part on determining that the first axle is the leading axle, reducing a first ride frequency at the first axle by reducing stiffness of a component of the first suspension subsystem; based at least in part on determining that the second axle is the trailing axle, increasing a second ride frequency at the second axle by increasing stiffness of the component of the second suspension subsystem; and controlling the bidirectional autonomous vehicle to travel in the second direction in an environment.

B: The bidirectional autonomous vehicle of paragraph A, wherein reducing stiffness of the component of the first suspension subsystem comprises reducing hydraulic pressure in one or more struts configured in the first suspension subsystem.

C: The bidirectional autonomous vehicle of paragraph A or B, further comprising: a valve fluidly coupled to the first suspension subsystem; and wherein reducing stiffness of the component of the first suspension subsystem comprises changing a state of the valve to modify fluid flow within the first suspension subsystem from a second state associated with the first axle being the trailing axle to a first state associated with the first axle being the leading axle.

D: The bidirectional autonomous vehicle of paragraph C, further comprising: a first fluid accumulator fluidly coupled to the first suspension subsystem; and a second fluid accumulator fluidly coupled with the valve.

E: A method comprising: determining that a bidirectional vehicle has altered its direction of travel from a first direction to a second direction; based at least in part on determining that the bidirectional vehicle has altered its direction of travel from the first direction to the second direction: determining a leading axle and a trailing axle of the bidirectional vehicle for the second direction; based at least in part on determining the leading axle, reducing a first ride frequency at the leading axle by reducing stiffness of a component of a first suspension subsystem associated with the leading axle; and based at least in part on determining the trailing axle, increasing a second ride frequency at the trailing axle by increasing stiffness of a component of a second suspension subsystem associated with the trailing axle.

F: The method of paragraph E, wherein increasing stiffness of the component of the second suspension subsystem comprises increasing hydraulic pressure in one or more struts associated with the second suspension subsystem.

G: The method of paragraph F, wherein: the second suspension subsystem comprises: a hydraulic fluid accumulator fluidly connected to a hydraulic circuit; the hydraulic circuit fluidly connected to the one or more struts; and a valve configured between the hydraulic fluid accumulator and the hydraulic circuit; and increasing hydraulic pressure in the one or more struts comprises closing the valve.

H: The method of any of paragraphs E-G, further comprising: controlling the bidirectional vehicle to travel in the first direction in an environment based at least in part on a first trajectory, wherein determining that the bidirectional vehicle has altered its direction of travel comprises: determining a second trajectory for the bidirectional vehicle; and controlling the bidirectional vehicle to travel in the second direction in the environment based at least in part on the second trajectory.

I: The method of paragraph H, further comprising detecting, based at least in part on sensor data, an object obstructing a path of the bidirectional vehicle, wherein determining the second trajectory is based at least in part on detecting the object obstructing the path of the bidirectional vehicle.

J: The method of paragraph H, wherein: the bidirectional vehicle entered a parking space traveling in the first direction; and determining the second trajectory is based at least in part on route data comprising a route to a destination, and the second trajectory is configured to cause the bidirectional vehicle to exit the parking space and travel along the route in the second direction.

K: The method of any of paragraphs E-J, wherein determining that the bidirectional vehicle has altered its direction of travel is based at least in part on data received from a wheel encoder.

L: The method of any of paragraphs E-K, further comprising ceasing reducing stiffness of the component associated with the first suspension subsystem and increasing stiffness of the component associated with the second suspension subsystem when a difference of stiffness of the first suspension subsystem relative to stiffness of the second suspension subsystem meets or exceeds a threshold.

M: The method of paragraph L, further comprising: determining stiffness of the first suspension subsystem based at least in part on a first hydraulic pressure of the component associated with the first suspension subsystem; and determining stiffness of the second suspension subsystem based at least in part on a second hydraulic pressure of the component associated with the second suspension subsystem.

N: The method of any of paragraphs E-M, wherein reducing stiffness of the component of the first suspension subsystem comprises reducing hydraulic pressure in a bushing associated with the first suspension subsystem.

O: The method of any of paragraphs E-N, wherein reducing stiffness of the component of the first suspension subsystem comprises controlling a valve to reduce hydraulic pressure in the component of the first suspension subsystem.

P: A bidirectional vehicle suspension system comprising: a suspension component configured at an axle of a bidirectional vehicle; and a suspension controller communicatively connected to the suspension component and configured to perform operations comprising: receiving an indication of a change in vehicle direction of travel from a first direction to a second direction; and based at least in part on the indication: determining whether the axle is a leading axle or a trailing axle; and based at least in part on determining whether the axle is the leading axle or the trailing axle, controlling the suspension component to alter a ride frequency at the axle by altering stiffness of the suspension component.

Q: The bidirectional vehicle suspension system of paragraph P, wherein receiving the indication of the change in vehicle direction of travel comprises: receiving sensor data from a sensor communicatively connected to the suspension controller communicatively connected; and determining the change in vehicle direction of travel based at least in part on the sensor data.

R: The bidirectional vehicle suspension system of paragraph P or Q, wherein altering stiffness of the suspension component comprises adjusting a valve configured between a hydraulic fluid accumulator and a hydraulic circuit fluidly connected to the suspension component.

S: The bidirectional vehicle suspension system of any of paragraphs P-R, wherein the suspension component comprises one or more of: a hydraulic strut; or an elasto-hydraulic bushing.

T: The bidirectional vehicle suspension system of any of paragraphs P-S, wherein the indication of the change in vehicle direction of travel further indicates that a speed of the bidirectional vehicle meets or exceeds a threshold speed.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A bidirectional autonomous vehicle comprising:
    a first suspension subsystem associated with a first axle of the bidirectional autonomous vehicle;
    a second suspension subsystem associated with a second axle of the bidirectional autonomous vehicle; and
    a vehicle computing system comprising one or more processors and one or more non-transitory computer-readable media storing instructions executable by the one or more processors, wherein the instructions, when executed, cause the vehicle computing system to perform operations comprising:
        determining that the bidirectional autonomous vehicle has altered its direction of travel from a first direction to a second direction, wherein altering its direction of travel comprises modifying a mode of a planner component of the bidirectional autonomous vehicle to primarily operate in the second direction and wherein the first direction opposes the second direction; and based at least in part on determining that the bidirectional autonomous vehicle has altered its direction of travel from the first direction to the second direction:
determining, based on the second direction, that the first axle is a leading axle of the bidirectional autonomous vehicle;
determining, based on the second direction, that the second axle is a trailing axle of the bidirectional autonomous vehicle;
based at least in part on determining that the first axle is the leading axle, reducing a first ride frequency at the first axle by reducing stiffness of an adjustment component of the first suspension subsystem;
based at least in part on determining that the second axle is the trailing axle, increasing a second ride frequency at the second axle by increasing stiffness of an adjustment component of the second suspension subsystem; and
controlling the bidirectional autonomous vehicle to travel in the second direction in an environment.

2. The bidirectional autonomous vehicle of claim 1, wherein reducing stiffness of the adjustment component of the first suspension subsystem comprises reducing hydraulic pressure in one or more struts configured in the first suspension subsystem.

3. The bidirectional autonomous vehicle of claim 1, further comprising:
a valve fluidly coupled to the first suspension subsystem;
wherein reducing stiffness of the adjustment component of the first suspension subsystem comprises changing a state of the valve to modify fluid flow within the first suspension subsystem from a second state associated with the first axle being the trailing axle to a first state associated with the first axle being the leading axle.

4. The bidirectional autonomous vehicle of claim 3, further comprising:
a first fluid accumulator fluidly coupled to the first suspension subsystem; and
a second fluid accumulator fluidly coupled with the valve.

5. A method comprising:
determining that a bidirectional vehicle has altered its direction of travel from a first direction to a second direction; and
based at least in part on determining that the bidirectional vehicle has altered its direction of travel from the first direction to the second direction:
determining a leading axle and a trailing axle of the bidirectional vehicle for the second direction;
based at least in part on determining the leading axle, reducing a first ride frequency at the leading axle by reducing stiffness of an adjustment component of a first suspension subsystem associated with the leading axle; and
based at least in part on determining the trailing axle, increasing a second ride frequency at the trailing axle by increasing stiffness of an adjustment component of a second suspension subsystem associated with the trailing axle.

6. The method of claim 5, wherein increasing stiffness of the adjustment component of the second suspension subsystem comprises increasing hydraulic pressure in one or more struts associated with the second suspension subsystem.

7. The method of claim 6, wherein:
the second suspension subsystem comprises:
a hydraulic fluid accumulator fluidly connected to a hydraulic circuit;
the hydraulic circuit fluidly connected to the one or more struts; and
a valve configured between the hydraulic fluid accumulator and the hydraulic circuit; and
increasing hydraulic pressure in the one or more struts comprises closing the valve.

8. The method of claim 5, further comprising:
controlling the bidirectional vehicle to travel in the first direction in an environment based at least in part on a first trajectory, wherein determining that the bidirectional vehicle has altered its direction of travel comprises:
determining a second trajectory for the bidirectional vehicle; and
controlling the bidirectional vehicle to travel in the second direction in the environment based at least in part on the second trajectory.

9. The method of claim 8, further comprising detecting, based at least in part on sensor data, an object obstructing a path of the bidirectional vehicle, wherein determining the second trajectory is based at least in part on detecting the object obstructing the path of the bidirectional vehicle.

10. The method of claim 8, wherein:
the bidirectional vehicle entered a parking space traveling in the first direction; and
determining the second trajectory is based at least in part on route data comprising a route to a destination, and the second trajectory is configured to cause the bidirectional vehicle to exit the parking space and travel along the route in the second direction.

11. The method of claim 5, wherein determining that the bidirectional vehicle has altered its direction of travel is based at least in part on data received from a wheelencoder.

12. The method of claim 5, further comprising ceasing reducing stiffness of the adjustment component associated with the first suspension subsystem and increasing stiffness of the adjustment component associated with the second suspension subsystem when a difference of stiffness of the first suspension subsystem relative to stiffness of the second suspension subsystem meets or exceeds a threshold.

13. The method of claim 12, further comprising:
determining stiffness of the first suspension subsystem based at least in part on a first hydraulic pressure of the adjustment component associated with the first suspension subsystem; and
determining stiffness of the second suspension subsystem based at least in part on a second hydraulic pressure of the adjustment component associated with the second suspension subsystem.

14. The method of claim 5, wherein reducing stiffness of the adjustment component of the first suspension subsystem comprises reducing hydraulic pressure in a bushing associated with the first suspension subsystem.

15. The method of claim 5, wherein reducing stiffness of the adjustment component of the first suspension subsystem comprises controlling a valve to reduce hydraulic pressure in the adjustment component of the first suspension subsystem.

16. A bidirectional vehicle suspension system comprising:
a first suspension component configured at a first axle of a bidirectional vehicle;

a second suspension component configured at a second axle of the bidirectional vehicle; and a suspension controller communicatively connected to the first suspension component and the second suspension component and configured to perform operations comprising:

receiving an indication of a change in vehicle direction of travel from a first direction to a second direction; and     based at least in part on the indication:

determining that the first axle is a leading axle and the second axle is a trailing axle;

based at least in part on determining that the first axle is the leading axle, reducing a first ride frequency at the first axle by reducing stiffness of the first suspension component; and         based at least in part on determining that the second axle is the trailing axle, increasing a second ride frequency at the second axle by increasing stiffness of the second suspension component.

17. The bidirectional vehicle suspension system of claim 16, wherein receiving the indication of the change in vehicle direction of travel comprises:

receiving sensor data from a sensor communicatively connected to the suspension controller; and     determining the change in vehicle direction of travel based at least in part on the sensor data.

18. The bidirectional vehicle suspension system of claim 16, wherein reducing stiffness of the first suspension component comprises adjusting a valve configured between a hydraulic fluid accumulator and a hydraulic circuit fluidly connected to the first suspension component.

19. The bidirectional vehicle suspension system of claim 16, wherein the first suspension component comprises one or more of:

a hydraulic strut; or an elasto-hydraulic bushing.

20. The bidirectional vehicle suspension system of claim 16, wherein the indication of the change in vehicle direction of travel further indicates that a speed of the bidirectional vehicle meets or exceeds a threshold speed.

\* \* \* \* \*